(12) United States Patent
Miyata et al.

(10) Patent No.: US 6,478,835 B2
(45) Date of Patent: Nov. 12, 2002

(54) ABRASIVE COMPOSITION FOR POLISHING MAGNETIC RECORDING DISK SUBSTRATES

(75) Inventors: Norihiko Miyata, Shiojiri (JP); Kiyoshi Tada, Oyama (JP); Kenji Tomita, Oyama (JP)

(73) Assignees: Showa Denko K.K., Tokyo (JP); Showa Aluminum Corp., Osaka (JP)

( * ) Notice: Subject to any disclaimer, the term of this patent is extended or adjusted under 35 U.S.C. 154(b) by 0 days.

(21) Appl. No.: 09/767,024

(22) Filed: Jan. 23, 2001

(65) Prior Publication Data

US 2002/0002797 A1 Jan. 10, 2002

Related U.S. Application Data

(60) Provisional application No. 60/246,574, filed on Nov. 8, 2000.

(30) Foreign Application Priority Data

Jan. 24, 2000 (JP) .......................................... 2002-013858

(51) Int. Cl.$^7$ ............................. C09K 3/14; C09G 1/02; C09G 1/04
(52) U.S. Cl. ............................. 51/308; 51/307; 51/309; 106/3; 438/692; 438/693
(58) Field of Search .......................... 51/308, 307, 309; 106/3; 438/692, 693; 252/79.1, 79.2, 79.4; 216/89

(56) References Cited

U.S. PATENT DOCUMENTS

| | | | | | |
|---|---|---|---|---|---|
| 5,783,489 | A | * | 7/1998 | Kaufman et al. | 438/692 |
| 6,152,976 | A | * | 11/2000 | Ishitobi et al. | 51/309 |
| 6,162,268 | A | * | 12/2000 | Knapp et al. | 51/308 |
| 6,258,140 | B1 | * | 7/2001 | Shemo et al. | 51/308 |
| 6,293,848 | B1 | * | 9/2001 | Fang et al. | 252/79.1 |

FOREIGN PATENT DOCUMENTS

JP          09204657 A    *    8/1997

* cited by examiner

Primary Examiner—Michael Marcheschi
(74) Attorney, Agent, or Firm—Sughrue Mion, PLLC

(57) ABSTRACT

The present invention provides an abrasive composition for polishing magnetic recording disk substrates that results in a low surface roughness of the magnetic recording disk, allows the attaining of high-density recording without the occurrence of protrusions or polishing scratches, and enables polishing to be performed at an economical speed. The present invention discloses an abrasive composition for polishing magnetic recording disk substrates comprising water, silicon dioxide, antigelling agent, aluminum nitrate and hydrogen peroxide.

6 Claims, No Drawings

ABRASIVE COMPOSITION FOR POLISHING MAGNETIC RECORDING DISK SUBSTRATES

CROSS-REFERENCE TO RELATED APPLICATIONS

This application claims the benefit of U.S. Provisional Application No. 60/246,574, filed Nov. 8, 2000.

BACKGROUND OF THE INVENTION

1. Field of the Invention

The present invention relates to an abrasive composition for polishing magnetic recording disk substrates, and more particularly, to an abrasive composition for polishing magnetic recording disk substrates that allows the obtaining of a magnetic recording disk surface of high accuracy suitable for enabling the flying height of a magnetic head from the disk to be reduced.

2. Description of Related Art

Magnetic recording disks (memory rigid disks) are widely used in the external memories of computers and word processors as means of allowing high-speed access. A typical example of such a magnetic recording disk is one which is produced by preparing a substrate by subjecting an Al alloy substrate to electroless plating of NiP on the surface, surface-polishing the substrate, and thereafter sequentially forming a Cr-alloy underlayer, a Co-alloy magnetic film, and a carbon protective film by sputtering.

When irregularities or protrusions which are higher than the flying height of a magnetic head remain on the surface of a magnetic recording disk, the magnetic head, which flies over the disk at a predetermined flying height and high speed, may hit such protrusions, causing damage to the head. When a magnetic recording disk substrate has protrusions and polishing scratches, in the case of formation of a Cr-alloy underlayer or a Co-alloy magnetic film on the substrate, protrusions and defects attributed to the polishing scratches arise on the surface of the film, and thus the resulting magnetic recording disk fails to have an even surface of high accuracy. Therefore, in order to produce a magnetic recording disk having a surface of high accuracy, the substrate of the disk must be accurately polished.

Consequently, there have been proposed many abrasive compositions which remove protrusions, minimize the height of protrusions or rarely form polishing scratches during polishing of magnetic recording disk substrates. For example, although Japanese Unexamined Patent Application, First Publication No. 10-121035 (use of a composition comprising the addition of aluminum nitrate to titania) easily achieves high surface accuracy and abrasion rate as compared with the prior art as a result of using submicron titanium oxide particles for the abrasive particles, it is difficult to achieve the level of surface accuracy required at present due to the effects of hardness of the abrasive particles. In addition, although Japanese Unexamined Patent Application, First Publication No. 11-167715 (use of a composition comprising the addition of aluminum nitrate to colloidal silica) makes it easy to obtain surface accuracy as a result of using fine particles of silicon dioxide having low hardness for the abrasive particles, it was difficult to achieve an abrasion rate that can be used in actual production.

BRIEF SUMMARY OF THE INVENTION

The quality required of abrasive compositions for polishing aluminum magnetic recording disk substrates that enable high-density magnetic recording is such that a highly accurate disk surface is achieved that allows reduction of the head flying height.

The object of the present invention is to provide an abrasive composition for polishing magnetic recording disk substrates that lowers the surface roughness of a magnetic recording disk, allows the attaining of high-density recording without the occurrence of protrusions or polishing scratches, and enables polishing to be performed at an economical high speed.

As a result of conducting extensive research on abrasive compounds for attaining a highly accurate polished surface required by aluminum magnetic recording disks having a low flying height, the inventors of the present invention found that an abrasive composition that uses silicon dioxide for the abrasive material and blends aluminum nitrate, antigelling agent and hydrogen peroxide therein demonstrates superior performance, thereby leading to completion of the present invention. Namely, the present invention is composed of each of the following inventions:

(1) an abrasive composition for polishing magnetic recording disk substrates comprising: water, silicon dioxide, antigelling agent, aluminum nitrate and hydrogen peroxide;

(2) an abrasive composition for polishing magnetic recording disk substrates according to (1) above, wherein the silicon dioxide is one or more types selected from colloidal silica, fumed silica and precipitated silica;

(3) an abrasive composition for polishing magnetic recording disk substrates according to either of (1) or (2) above, wherein the average particle size of secondary particles of the silicon dioxide is 0.03–0.5 $\mu$m;

(4) an abrasive composition for polishing magnetic recording disk substrates according to any of (1) through (3) above, wherein the concentration of silicon dioxide in the composition is 3–30 wt %;

(5) an abrasive composition for polishing magnetic recording disk substrates according to any of (1) through (4) above, wherein the antigelling agent is one or more types selected from a phosphonic acid compound, phenanthroline and acetylacetone aluminum salt; and, (6) an abrasive composition for polishing magnetic recording disk substrates according to (5) above, wherein the phosphonic acid compound is 1-hydroxyethane-1,1-diphosphonic acid.

According to the present invention, an abrasive composition for polishing magnetic recording disk substrates that is comprised of water, silicon dioxide, antigelling agent, aluminum nitrate and hydrogen peroxide such that, due to the presence of the three ingredients of antigelling agent, aluminum nitrate and hydrogen peroxide, a higher abrasion rate is obtained.

Although the abrasive composition for polishing of the present invention can be advantageously applied to, for example, a substrate for high-density recording such as a magnetic recording disk for magnetic heads utilizing magnetoresistance (MR) effects (normally having a recording density of 1 Gbit/inch$^2$ or more), it can also be applied effectively to magnetic recording disks having a lower recording density from the standpoint of improving reliability.

When disks are polished using the abrasive composition for polishing of the present invention, surface roughness can be reduced significantly and polishing can be performed at a high abrasion rate. A magnetic recording disk using a polished disk is useful as a low flying height rigid disk, and enables high-density recording.

In particular, a magnetic recording disk using a polished disk has a high degree of usefulness as a high-density recording medium typically represented by media for MR heads (having a recording density of 1 Gbit/inch$^2$ or more). It is also useful for magnetic recording disks having a lower recording density from the viewpoint of being a highly reliable medium.

DETAILED DESCRIPTION OF THE INVENTION

There are no particular restrictions on the silicon dioxide contained as abrasive material in the abrasive composition for polishing of the present invention, colloidal silica, fumed silica or precipitated silica may be used, and the average particle size of the secondary particles is preferably 0.03–0.5 μm. The average particle size of the secondary particles refers to the value measured by means of the MICROTRAC UPA 150 (manufactured by Honeywell), which is a laser Doppler frequency analysis type of particle size distribution measuring instrument.

Although it becomes easier to inhibit fine gelling and aggregation when the size of the secondary particles of the silicon dioxide increases, since the probability of the existence of coarse particles also increases, this can cause the occurrence of polishing scratches. In addition, if the size of the secondary particles decreases, there is increased susceptibility to the above gelling and aggregation, which also causes the occurrence of polishing scratches. Thus, the average particle size of the secondary particles of the silicon dioxide contained as abrasive material in the abrasive composition for polishing of the present invention is preferably 0.03–0.5 μm, and more preferably 0.04–0.2 μm.

If the concentration of silicon dioxide in the abrasive composition for polishing is less than 3 wt %, the abrasion rate decreases remarkably. In addition, as the concentration of silicon dioxide increases, although abrasion rate also increases, if the concentration exceeds 30 wt %, no further increases in abrasion rate are observed, and gelling occurs easily particularly in the case of colloidal silica. In consideration of economic feasibility, the practical upper limit of the silicon dioxide concentration is 30 wt %. Thus, the concentration of silicon dioxide in the abrasive composition is preferably within the range of 3–30 wt %, and more preferably within the range of 5–15 wt %.

Although considerable abrasion promotional effects are obtained as a result of using a mixture of the three ingredients of antigelling agent, aluminum nitrate and hydrogen peroxide in the abrasive composition for polishing of the present invention, the amount of antigelling agent added is preferably 0.1–2 wt % and preferably 0.3–1 wt %, the amount of aluminum nitrate added is preferably 1–20 wt % and preferably 2–15 wt %, and the amount of hydrogen peroxide added is preferably 0.2–5 wt % and preferably 0.5–3 wt %.

If the amount of antigelling agent added is less than 0.1 wt %, abrasion promotional effects are diminished and gelling occurs more easily. In addition, even if the amount of antigelling agent added exceeds 2 wt %, there is no increase in abrasion promotional effects.

If the amount of aluminum nitrate added is less than 1 wt %, abrasion promotional effects diminish. In addition, gelling tends to occur more easily if the amount of aluminum nitrate added exceeds 20 wt %.

If the amount of hydrogen peroxide added is less than 0.2 wt %, abrasion promotional effects diminish. In addition, even if the amount of hydrogen peroxide added exceeds 5 wt %, there is no increase in abrasion promotional effects.

The antigelling agent used in the present invention is preferably one type or a mixture of two or more types selected from a phosphonic acid compound, phenanthroline and acetylacetone aluminum salt. Specific examples of phosphonic acid compounds include 1-hydroxyethane-1,1-diphosphonic acid ($C_2H_6O_7P_2$) and aminotrimethylene phosphonic acid ($C_2H_{12}O_9P_3N$), a specific example of phenanthroline is 1,10-phenanthroline hydrate ($C_{12}H_8N_2.H_2O$), and a specific example of an acetylacetone aluminum salt is aluminum complex salt of acetylacetone ($Al_2[CH(COCH_3)_3]$). In particular, 1-hydroxyethane-1,1-diphosphonic acid is the most effective as an abrasion promoter.

Each of the above ingredient concentrations refer to the concentrations during polishing of a magnetic recording disk substrate. In the case of producing an abrasive composition for polishing and shipping, etc., it is effective to produce an abrasive composition having concentrations greater than those indicated above and then use after diluting to the above concentrations at the time of use.

Although the abrasive composition for polishing of the present invention is able to demonstrate considerable abrasion promotional effects by mixing the three ingredients of antigelling agent, aluminum nitrate and hydrogen peroxide into silicon dioxide, its mechanism is uncertain. However, it is presumed that the effect of dispersing the antigelling agent has mild physical abrading action, the oxidation effect of the hydrogen peroxide serves to amplify the abrasion promotional effect of the aluminum nitrate making chemical abrading action more effective. By mixing these three ingredients, abrasion rate has been confirmed to be higher than the case of mixing any two ingredients, and the occurrence of polishing scratches and pitting has been confirmed to be inhibited.

In addition to each of the ingredients described above, additives such as surfactant and preservative can also be added to the abrasive composition for polishing magnetic recording disk substrates of the present invention. However, it is necessary to use caution with respect to the types and amounts of additives added so as not to induce gelling.

Similar to abrasive compositions for polishing of the prior art, the abrasive composition for polishing of the present invention can be produced by suspending silicon dioxide in water and then adding antigelling agent, aluminum nitrate and hydrogen peroxide, etc.

Although there are no particular restrictions on the type of magnetic recording rigid disk substrate to which the abrasive composition for polishing of the present invention is applied, when the abrasive composition of the present invention is applied to polishing of aluminum (including aluminum alloy) substrates, and particularly aluminum substrates, for example, subjected to electroless plating of NiP, a polished surface of high quality can be obtained due to synergism between the mild physical abrading action produced by the silicon dioxide, and the chemical abrading action produced by the antigelling agent, aluminum nitrate and hydrogen peroxide.

The polishing method is performed by sliding a polishing pad typically used for slurry abrasive materials over the magnetic recording disk substrate, and rotating the pad or substrate while feeding slurry between the pad and substrate.

A magnetic recording disk made from a substrate that has been polished by using the abrasive composition for polishing of the present invention has an extremely low frequency of occurrence of minute defects such as micropits and microscratches, surface roughness (Ra) of about 0.2–0.3 nm, and superior evenness.

EXAMPLES

Although the following provides a detailed explanation of examples of the present invention, the present invention is not limited to these examples.

Examples 1–13

Water, antigelling agent, aluminum nitrate and hydrogen peroxide were added to colloidal silica (SYTON HT-50F, manufactured by E.I. du Pont de Nemours and Company) in the proportions shown in Table 2 to prepare various aqueous abrasive compositions for polishing, after which polishing was performed with the polishing machine and under the polishing conditions shown below. Those results are shown in Table 2.

Furthermore, particle size was measured by means of the MICROTRAC UPA 150 (manufactured by Honeywell), which is a laser Doppler frequency analysis type of particle size distribution measuring instrument. Particle size measured values are shown in Table 1.

Examples 14 and 15

Precipitated silica (Nippon Silica Industrial Co., Ltd., E-150) and fumed silica (Nippon Aerosil Co., Ltd., AEROSIL 50) were ground using a medium stirring mill and coarse particles were removed by grading to prepare silicon dioxide in which the average particle size of the secondary particles was 0.1 $\mu$m. Next, water, antigelling agent, aluminum nitrate and hydrogen peroxide were added in the proportions shown in Table 2 to prepare various aqueous abrasive compositions for polishing followed by polishing with the polishing machine and under the polishing conditions shown below. Those results are shown in Table 2. Furthermore, particle size measured values are shown in Table 1.

Polishing conditions:
Substrate employed: 3.5-inch aluminum disk electroless-plated with NiP.
Polishing machine used and polishing conditions:
Polishing testing machine: 4-way double-sided polishing machine
Polishing pad: Suede type (POLITEX DG, Rodel Inc.)
Lower platen rotating speed: 60 rpm
Slurry feed rate: 50 ml/min
Polishing time: 5 min
Working pressure: 50 g/cm$^2$
Evaluation of polishing characteristics:
Abrasion rate: Calculated from the difference in weight before and after polishing the aluminum disk
Surface roughness: Measured using Talystep and Talydata 2000 (Rank Taylor Hobson Ltd.)

The depths of polishing scratches and polishing pits were determined by three-dimensional shape analysis using the P-12 surface analyzer equipped with a stylus (TENCOR).

The results of evaluating polishing characteristics are shown in Table 2. In Table 2, rating "A" refers to cases in which the depth of a polishing scratch or polishing pit is 5 nm or less, while rating "B" refers to cases in which the depth of a polishing scratch or polishing pit is 5–10 nm. There were no polishing scratches or polishing pits having a depth of more than 10 nm in any of the examples or comparative examples.

Comparative Examples 1 and 2

Water, antigelling agent, aluminum nitrate and hydrogen peroxide were added to colloidal silica (SYTON HT-50F, manufactured by E.I. du Pont de Nemours and Company) in the proportions shown in Table 2 to prepare an aqueous abrasive composition for polishing followed by polishing in the same manner as the examples. Those results are shown in Table 2.

Comparative Example 3

Titanium oxide (SUPER TITANIA F-2, Showa Titanium Co. Ltd.) was ground using a medium stirring mill followed by removal of coarse particles by grading to first obtain titanium oxide having an average particle size of 0.3 $\mu$m. Next, water and aluminum nitrate were added in the proportions shown in Table 2 to prepare an aqueous abrasive composition for polishing followed by polishing in the same manner as the examples. Those results are shown in Table 2. Furthermore, particle size measured values are shown in Table 1.

TABLE 1

|  | Product name | Primary particle size ($\mu$m) | Secondary particle size ($\mu$m) |
| --- | --- | --- | --- |
| Silicon dioxide (1) (Silica (1)) | SYTON HT-50F | 0.05 | 0.05 |
| Silicon dioxide (2) (Silica (2)) | E-150J | 0.03 | 0.1 |
| Silicon dioxide (3) (Silica (3)) | AEROSIL 50 | 0.05 | 0.1 |
| Titanium oxide (titania) | F-2 | 0.06 | 0.3 |

TABLE 2

|  |  | Abrasive | | Antigelling agent | Aluminum nitrate | Hydrogen peroxide | Abrasion | Surface | | |
| --- | --- | --- | --- | --- | --- | --- | --- | --- | --- | --- |
|  |  | Type | Amount added wt % | Type | Amount added (wt %) | Amount added (wt %) | Amount added (wt %) | rate ($\mu$m/min) | roughness (Ra) (nm) | Polishing scratches | Polishing pits |
| Example | 1 | Silica (1) | 2 | 1-hydroxyethane-1,1-diphosphonic acid | 0.3 | 5.0 | 1.0 | 0.11 | 0.2 | A | A |
|  | 2 | Silica (1) | 6 | 1-hydroxyethane-1,1-diphosphonic acid | 0.3 | 5.0 | 1.0 | 0.20 | 0.2 | A | A |
|  | 3 | Silica (1) | 15 | 1-hydroxyethane-1,1-diphosphonic acid | 0.3 | 5.0 | 1.0 | 0.24 | 0.2 | A | A |
|  | 4 | Silica (1) | 6 | 1-hydroxyethane-1,1-diphosphonic acid | 1.0 | 5.0 | 1.0 | 0.24 | 0.2 | A | A |
|  | 5 | Silica (1) | 6 | 1-hydroxyethane-1,1-diphosphonic acid | 2.0 | 5.0 | 1.0 | 0.25 | 0.2 | A | A |

TABLE 2-continued

|  |  | Abrasive | | Antigelling agent | | Aluminum nitrate | Hydrogen peroxide | Abrasion rate (μm/ min) | Surface roughness (Ra) (nm) | Polishing scratches | Polishing pits |
|---|---|---|---|---|---|---|---|---|---|---|---|
|  |  | Type | Amount added wt % | Type | Amount added (wt %) | Amount added (wt %) | Amount added (wt %) | | | | |
|  | 6 | Silica (1) | 6 | 1-hydroxyethane-1,1-diphosphonic acid | 0.3 | 2.0 | 1.0 | 0.18 | 0.2 | A | A |
|  | 7 | Silica (1) | 6 | 1-hydroxyethane-1,1-diphosphonic acid | 0.3 | 10.0 | 1.0 | 0.23 | 0.2 | A | A |
|  | 8 | Silica (1) | 6 | 1-hydroxyethane-1,1-diphosphonic acid | 0.3 | 5.0 | 0.1 | 0.12 | 0.2 | A | A |
|  | 9 | Silica (1) | 6 | 1-hydroxyethane-1,1-diphosphonic acid | 0.3 | 5.0 | 0.5 | 0.18 | 0.2 | A | A |
|  | 10 | Silica (1) | 6 | 1-hydroxyethane-1,1-diphosphonic acid | 0.3 | 5.0 | 2.0 | 0.22 | 0.2 | A | A |
|  | 11 | Silica (1) | 6 | Aminotrimethylene phosphonic acid | 0.3 | 5.0 | 1.0 | 0.20 | 0.2 | A | A |
|  | 12 | Silica (1) | 6 | 1,10-phenanthroline monohydrate | 0.3 | 5.0 | 1.0 | 0.19 | 0.2 | A | A |
|  | 13 | Silica (1) | 6 | Acetylacetone aluminum salt | 0.3 | 5.0 | 1.0 | 0.19 | 0.2 | A | A |
|  | 14 | Silica (2) | 6 | 1-hydroxyethane-1,1-diphosphonic acid | 0.3 | 5.0 | 1.0 | 0.20 | 0.2 | A | A |
|  | 15 | Silica (3) | 6 | 1-hydroxyethane-1,1-diphosphonic acid | 0.3 | 5.0 | 1.0 | 0.20 | 0.2 | A | A |
| Comp. | 1 | Silica (1) | 6 | — | — | 5.0 | 1.0 | 0.08 | 0.4 | B | A |
| Example | 2 | Silica (1) | 6 | 1-hydroxyethane-1,1-diphosphonic acid | 0.3 | — | 1.0 | 0.09 | 0.2 | A | A |
|  | 3 | Titania | 6 | — | — | 5.0 | — | 0.21 | 0.4 | B | B |

What is claimed is:

1. An abrasive composition for polishing magnetic recording disk substrates comprising: water, silicon dioxide, antigelling agent, aluminum nitrate and hydrogen peroxide.

2. An abrasive composition for polishing magnetic recording disk substrates according to claim 1, wherein said silicon dioxide is at least one selected from the group consisting of colloidal silica, fumed silica and precipitated silica.

3. An abrasive composition for polishing magnetic recording disk substrates according to claim 1, wherein the silicon dioxide contains secondary particles and the average particle size of the secondary particles of the silicon dioxide is 0.03–0.5 μm.

4. An abrasive composition for polishing magnetic recording disk substrates according to claim 1, wherein the concentration of silicon dioxide in the composition is 3–30 wt %.

5. An abrasive composition for polishing magnetic recording disk substrate according to claim 1, wherein the antigelling agent is at least one material selected from the group consisting of a phosphonic acid compound, phenanthroline and acetylacetone aluminum salt.

6. An abrasive composition for polishing magnetic recording disk substrates according to claim 5, wherein the phosphonic acid compound is 1-hydroxyethane-1,1-diphosphonic acid.

* * * * *

UNITED STATES PATENT AND TRADEMARK OFFICE
CERTIFICATE OF CORRECTION

PATENT NO. : 6,478,835 B2
DATED : November 12, 2002
INVENTOR(S) : Norihiko Miyata, Kiyoshi Tada and Kenji Tomita It is certified that error appears in the above-identified patent and that said Letters Patent is hereby corrected as shown below:

<u>Title page,</u>
Item [30], Foreign Application Priority Data, please change "2002-013858" to -- 2000-013858 --.

Signed and Sealed this

Fifteenth Day of April, 2003

JAMES E. ROGAN
*Director of the United States Patent and Trademark Office*